Figure 1:
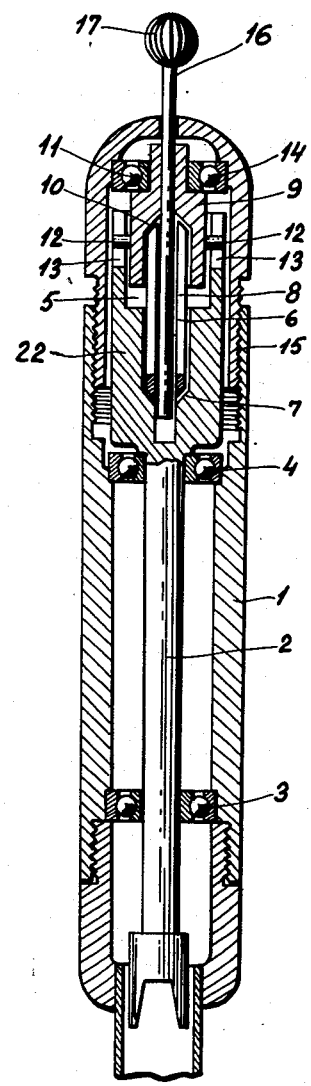

Jan. 19, 1954  O. THAÜ-JENSEN  2,666,259
HANDPIECE FOR ROTARY TOOLS, ESPECIALLY
FOR DENTISTS' USE
Filed Oct. 9, 1950

INVENTOR.
Orla Thau-Jensen
BY
Richardson, David and Nordon
his ATTYS.

Patented Jan. 19, 1954

2,666,259

UNITED STATES PATENT OFFICE 2,666,259

HANDPIECE FOR ROTARY TOOLS, ESPECIALLY FOR DENTISTS' USE

Orla Thau-Jensen, Hurup, Thy, Denmark

Application October 9, 1950, Serial No. 189,124

4 Claims. (Cl. 32—26)

This invention relates to handpieces for rotary tools, especially for dentists' use. Such handpieces comprise a preferably tubular casing having a tool chuck-carrying spindle mounted for rotation therein and ordinarily adapted to be connected to a flexible shaft.

One object of the invention is to provide a relatively simple and sturdy construction of such handpieces requiring a minimum of attendance and affording a maximum of reliability in operation.

Another object is to provide a construction in which the rotary tools may be inserted and removed without stopping the rotation of the spindle of the handpiece.

A further object is to provide a handpiece having a forward spindle bearing arranged close to the tool gripped in the tool chuck so as to insure a good radial support of such tool.

Figure 2:
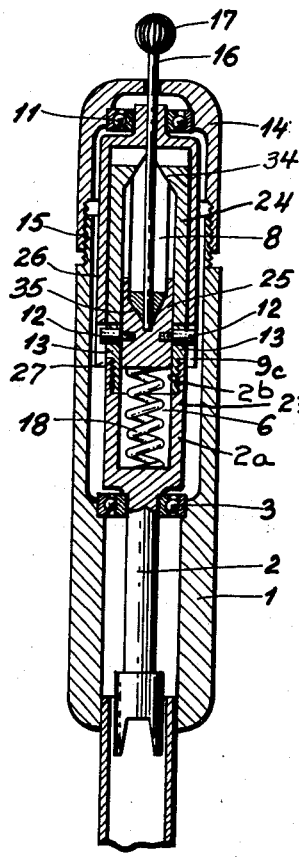
Figure 3:
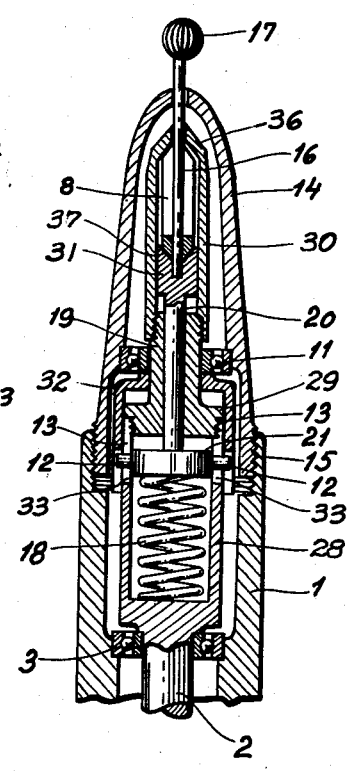

The invention is illustrated in the drawing in which:

Fig. 1 is an axial sectional view of a handpiece for rotary tools in accordance with this invention, Fig. 2 is a similar view of another handpiece embodying the invention, and Fig. 3 shows a modification of the construction shown in Fig. 2.

Throughout the drawings like reference characters designate corresponding parts.

Referring now to Fig. 1, I denotes a tubular casing which is adapted to have its rear end connected to a flexible driving shaft in a manner which constitutes no part of the present invention. A spindle 2 adapted to be driven by such flexible shaft, is mounted in ball bearings 3 and 4 in the casing 1, the spindle having a shoulder abutting against the inner ball race of the bearing 4, which latter is of a construction enabling it to withstand axial as well as radial thrust.

The forward enlarged end 22 of the spindle 2 is formed with an axial bore or recess 6 which, at its forward end is enlarged as indicated at 5. The inner end of the bore recess 6 is formed to constitute a conical seat 7 co-axial with the spindle 2. A slotted tool-gripping sleeve or chuck 8 is arranged in the bore 6 and is formed with conical end faces. The forward end of the chuck 8 is surrounded by a chuck-actuating socket 9 arranged in the enlarged portion 5 of the recess and having a conical seat 10 for the forward conical end of the chuck 8. The socket 9 is provided with radial projections 12 engaging longitudinal slots 13 in the walls surrounding the recess 5, so that the socket is caused to rotate with the spindle 2, but is capable of axial displacement relative thereto. The forward end of the socket 9 is mounted in a ball bearing 11 and has a shoulder abutting against the inner ball race thereof. The ball bearing 11, which is also of a type capable of receiving axial thrust, has its outer race arranged in a cap 14 constituting the foremost portion of the casing 1 and connected to the latter by means of screw threads 15.

It will be appreciated that, when the cap 14 is turned relative to the casing 1 to screw it into the latter, the tool-gripping chuck 8 will be clamped between the conical seats 7 and 10 so as to be compressed around a shank 16 of a rotary tool 17 introduced into the chuck. When the cap 14 is turned in the opposite direction, the tool-gripping chuck 8 is released, so that the tool 17 can be removed. It will be evident that this can be effected, irrespective of the fact, whether the spindle 2 is rotating, or not.

The handpiece described with reference to Fig. 1 is extremely easy to disassemble for cleaning by simply removing the screw cap 14. The handpiece comprises a very small number of parts, as compared with the handpieces of the kind in question known heretofore, and presents no projecting levers or like parts which might hamper the handling of the device. An adjustment of the ball bearings of the handpiece is not required, any slackness thereof being taken up when the tool 17 is gripped in the chuck 8.

In the construction shown in Fig. 2, the casing 1 is provided with only one ball bearing 3 for the spindle 2, and the recessed forward end of the spindle is composed by two parts 23 and 24 connected together by means of screw threads so as to present a common axial bore 6 which is restricted at its forward end to constitute an inner conical seat 34 adapted to receive the forward end of the tool-gripping chuck 8. A chuck-actuating member 25 is arranged in the recess 6 behind the chuck 8 and is formed with a conical seat 35 engaging the rear end of the chuck 8 under the action of a helical spring 18 interposed between the member 25 and the bottom of the recess 6. The member 25 is formed with radial projections or pins 12 extending through longitudinal slots 13 in the walls of the member 24. The forward end 23, 24 of the spindle is surrounded by a socket 26 constituting a sliding fit therewith and having its forward restricted end mounted in the ball bearing 11 in the screw cap 14. The socket 26 is at its rear end formed with longitudinal slots 27 engaged by the pins 12, so that, when the cap 14 is screwed backwards relative to the casing 1, the inner ends of the slots 27 will engage the pins 12 to urge the chuck-actuating member 25 back against the action of the spring 18 to permit the tool-gripping chuck 8 to expand so as to be capable of receiving the shank 16 of the tool 17. When subsequently the cap 14 is turned in a manner to move the bearing 11 forwards relative to the casing 1, the spring 18 will urge the member 25 forwards to engage the chuck so that the latter is compressed around the tool shank 16.

Obviously, with this construction the necessary force for compressing the tool-gripping chuck is only delivered by the spring 18 and is completely taken up within the spindle head 23, 24 so that no axial thrust is exerted upon the bearings 3 and 11 due to compression of the tool-gripping chuck, i. e. these bearings are during operation only subjected to such axial thrust as may be exerted by the tool 17 engaging a workpiece. Only when the spring 18 is compressed by screwing back the cap 14 for exchanging of the tool 17, i. e. when the bearings 3 and 11 are subjected to no load due to the working of the tool 17, these bearings are subjected to an axial thrust equal to the compressive force of the spring 18. The bearings are thus greatly relieved, as compared with the construction shown in Fig. 1 and may, therefore, have correspondingly smaller dimensions so as to make the handpiece more slender and handy.

The advanced position of the bearing 11 in the constructions shown in Figures 1 and 2 makes the nose of the handpiece rather stumpy. This sturdy construction makes the handpiece especially fit for dentists' shopwork, i. e. boring, grinding etc. not effected on the patient, while handpieces intended for clinical use should have a nose substantially in the shape of a long and slender cone, so as to afford good views towards the place of operation. This involves a certain retraction of the bearing 11, and the modification illustrated in Fig. 3 shows, how this bearing can be arranged in a retracted position without the tool-gripping chuck 8 and the parts co-operating therewith being correspondingly retracted.

In the modification shown in Fig. 3 the head of the spindle 2 is composed by three parts 28, 29, 30 connected with each other by means of screw threads. The member 29 is at its forward end formed with a neck 19 which is slidably guided in the bearing 11 and onto which the member 30 is threaded. The latter is restricted at its forward end to constitute an inner conical seat 36 and contains the slotted sleeve 8 as well as a chuck-actuating member 31 having a conical seat 37. The member 31 is formed with an axial rearward extension 20 extending through the neck 19 and connected at its rear end with a piston-like member 21 mounted for axial sliding movement in the spindle head 28 and subjected to the action of the coil spring 18. The member 21 carries the radial pins 12 by means of which connection is established between the member 31 and a socket 32.

The socket 32 is slidably guided upon the spindle head 28 and engaged with its forward restricted end at one side face of the inner ball race of the bearing 11. The principle of operation is the same as that of the construction shown in Fig. 2. It will be appreciated that, in both instances the bearings 3 and 11 are only subjected to axial thrust when the cap 14 is screwed back to compress the spring 18 and thereby to release the tool-shank 16 gripped in the sleeve 8, while during normal use of the handpiece the bearings will only have to take up the stresses imposed thereupon by the tool 17.

By removing the cap 14 and separating the parts 23, 24 or 28—30, respectively, of the spindle head, the whole hand piece can be disassembled for cleaning or repair.

I claim:

1. A handpiece for rotary tools, comprising a tubular casing, a spindle mounted for rotation therein by means of bearings adapted to receive axial and radial thrust, a recess in the forward end of said spindle co-axial therewith, a co-axial conical seat in said recess, a chuck-actuating member mounted for axial displacement relative to said spindle and said casing and having another co-axial conical seat facing said first-named seat, a tool-gripping chuck mounted between said conical seats to be actuated thereby for gripping and releasing, respectively, of a tool-shank, a cap at the forward end of said casing and surrounding said forward end of said spindle, said cap being adapted to be screwed forwards and backwards relative to said casing and being operatively connected with said axially displaceable chuck-actuating member for controlling axial displacement thereof in accordance with axial displacement of said cap.

2. A handpiece for rotary tools, comprising a tubular casing, a spindle mounted for rotation therein by means of bearings adapted to receive axial and radial thrust, a recess in the forward end of said spindle co-axial therewith, a co-axial conical seat in said recess, a chuck-actuating member mounted for axial displacement relative to said casing and said spindle and having another co-axial conical seat facing said first-named seat, a tool-gripping chuck mounted between said conical seats to be actuated thereby for gripping and releasing, respectively, of a tool-shank, a cap at the forward end of said casing and adapted to be screwed forwards and backwards relative thereto, said cap surrounding the forward end of said spindle, an axial thrust bearing having one race mounted in said front cap and having another race operatively connected with said axially displaceable chuck-actuating member for controlling axial displacement thereof towards and away from said tool-gripping chuck in accordance with axial displacement of said cap.

3. A handpiece for rotary tools, comprising a tubular casing, a spindle mounted for rotation in said casing by means of bearings adapted to receive axial and radial thrust, an axial recess in the forward end of said spindle, said recess being restricted at its outer end to constitute a conical seat facing the inner end of said recess, an axially slidable chuck-actuating member in said recess having another conical seat facing said first-named seat and provided with radial projections extending through longitudinal slots in the walls surrounding said recess, a tool-gripping chuck mounted between said opposed seats, resilient means interposed between the inner end of said recess and said chuck-actuating member for urging the latter to engage said tool-gripping chuck between said seats for causing it to grip a tool-shank introduced therein, a front cap on said casing and surrounding said forward end of said spindle, said cap being adapted to be axially adjusted relative to said casing and said spindle, an axial thrust bearing in said cap, and a socket enclosed in said cap and surrounding said forward end of said spindle and having one end supported by said last-named bearing and being adapted to engage said radial projections to disengage said axially slidable chuck actuating member from said tool gripping chuck against the action of said resilient means according to axial adjustment of said front cap.

4. A handpiece for rotary tools, comprising a substantially tubular casing, a cap at the forward end of said casing adapted to be axially adjusted relative thereto, a bearing in said casing and another bearing in said front cap, said bearings being mounted co-axially and being of a type capable of receiving radial as well as axial thrust, a rotatable spindle mounted with its rear end in the bearing of said casing and having its forward end enclosed in said front cap, a socket slidably surrounding said forward end of said spindle and mounted for rotation in said bearing of said front cap to be axially adjusted therewith, an axial recess in the forward end of said spindle, said recess being restricted at its outer end to constitute an inner conical seat, an axially slidable chuck-actuating member in said recess having another conical seat facing said first-named seat and provided with radial projections extending through longitudinal slots in the walls surrounding said recess to engage said socket for axial movement of said chuck-actuating member with said socket, a tool-gripping chuck mounted between said opposed seats, and resilient means interposed between the inner end of said recess and said chuck-actuating member for urging the latter to engage said tool-gripping chuck between said seats for causing it to grip a toolshank introduced therein.

ORLA THAU-JENSEN.

References Cited in the file of this patent

UNITED STATES PATENTS

| Number | Name | Date |
| --- | --- | --- |
| 255,020 | Rehfuss | Mar. 14, 1882 |
| 287,761 | Gilbert | Oct. 30, 1883 |
| 1,697,576 | Shotton | Jan. 1, 1929 |